May 11, 1926. 1,583,916
J. L. DEMARS
SHOVEL OR LIKE IMPLEMENT
Original Filed March 16, 1922
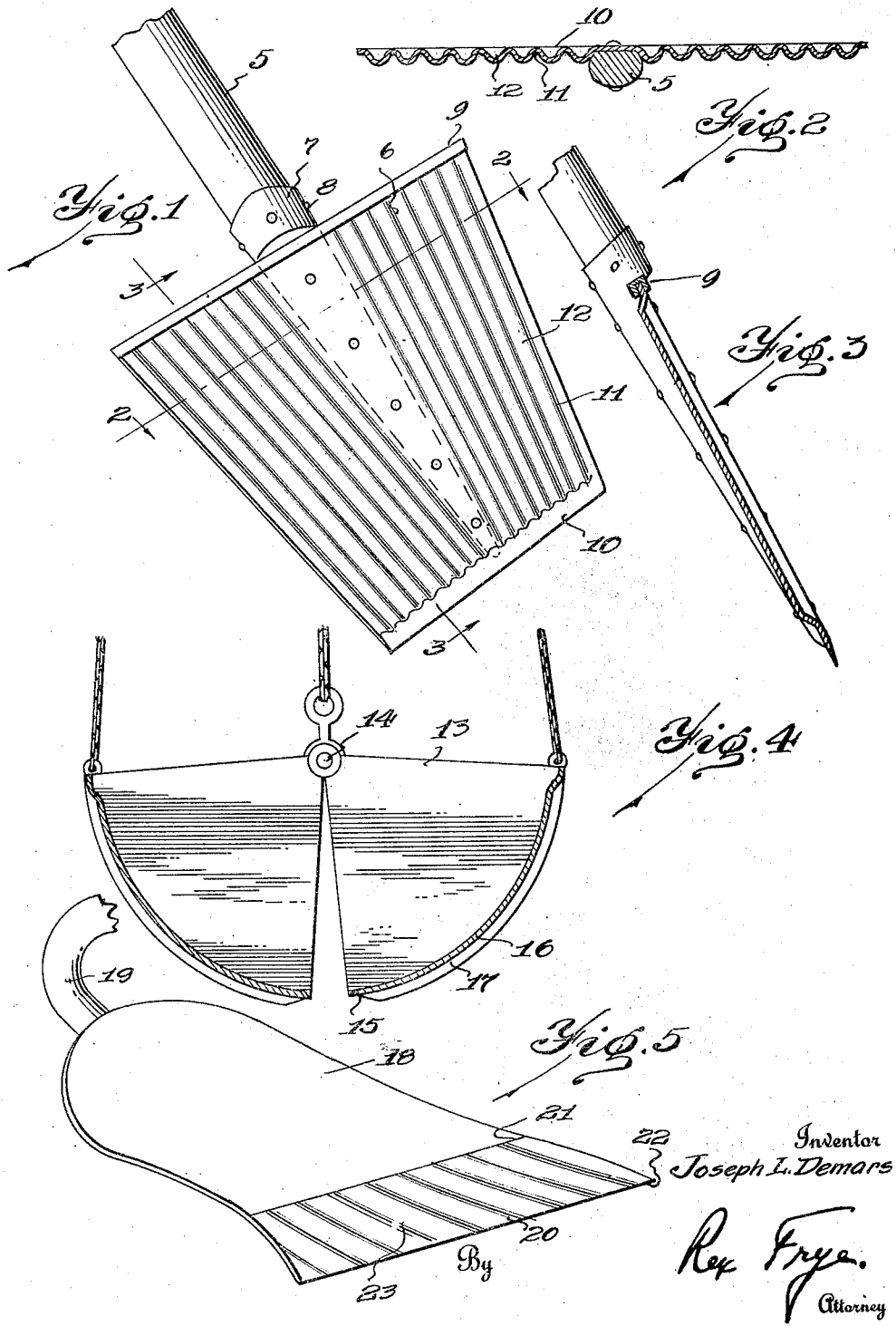
Inventor
Joseph L. Demars
By Rex Frye.
Attorney Patented May 11, 1926.

1,583,916

UNITED STATES PATENT OFFICE.

JOSEPH L. DEMARS, OF FAIR HAVEN, MICHIGAN.

SHOVEL OR LIKE IMPLEMENT.

Application filed March 16, 1922, Serial No. 544,163. Renewed December 15, 1925.

This invention relates to shovels and like earth-contacting implements, and has for its principal object the provision of a shovel or the like constructed and arranged to maintain a thin layer of fluid between the earth and the face of the shovel to minimize friction and labor and increase the efficiency of both the implement and its operator.

It has long been a desideratum among manufacturers and operators of hand and power shovels, plows and the like to lessen the drag or friction between the implement and the material handled, which friction often becomes excessive when certain materials, such as sticky clay or moist earth, are being dealt with, necessitating the employment of extraordinary power as well as frequent stops to free the material that adheres upon the face of the shovel. My improved shovel overcomes these objectionable features to a large degree, and provides a simple and efficient implement that may be operated with a minimum expenditure of power and time.

The above and other objects of my invention will be apparent from the following description wherein reference is made to the accompanying drawings illustrating preferred embodiments of my invention, and wherein similar reference numerals designate similar parts throughout the several views.

In the drawings:—

Fig. 1 is a perspective view of the blade portion of a hand shovel constructed in accordance with my invention;

Fig. 2 is a cross section taken substantially on the line 2—2 of Fig. 1;

Fig. 3 is a longitudinal section taken substantially on the line 3—3 of Fig. 1;

Fig. 4 is a central section showing the application of my invention to a power shovel, and Fig. 5 is a side elevation of a plowshare constructed in accordance with my invention.

Referring now to the drawings the numeral 5 designates the handle of a shovel which may be secured in any desired manner to the blade portion 6, the illustrated embodiment disclosing a tapered socket 7 adapted to receive the lower extremity of the handle, rivets 8 passing through both socket and handle in the usual manner. The blade portion 6 is constructed with a reinforced rear edge 9 and a sharpened cutting edge 10, the cutting edge being preferably sharpened and beveled so that the upper extremity of the bevel is in substantial alignment with the upper extremities of the walls 11 of a double series of longitudinal grooves 12 (note Fig. 2). The grooves 12 of each series, as herein shown, are in substantial alignment, although each groove is of varying width, tapering gradually toward the cutting edge 10 of the shovel. In other words, the sides of the grooves 12 all extend in the same direction and each groove gradually widens as the distance from the cutting edge becomes greater. The two series of grooves are oppositely disposed with reference to the longitudinal axis of the shovel, and the grooves of each series incline away from the longitudinal axis as they recede from the cutting edge. The grooves 12 are preferably formed by stamping or pressing the blade portion of the shovel into substantially the shape shown in Fig. 2 with the uppermost portions 11 of the grooves in substantial alignment with the upper portion of the cutting edge. This may be done by sinking the major portion of the grooves below the normal face of the shovel, as shown in Fig. 3, or by raising the cutting edge of the shovel, or in any other desired manner. It will also be understood that the blade portion of the shovel can be made in any desired shape, as for example the usual shapes of dirt and coal shovels, spades, snow shovels, etc. The upper face of the cutting edge 10 is reduced in area to the lowest possible degree consistent with strength, so that the friction or drag encountered in pushing the blade of the shovel into the earth or other material being handled will be minimized. As the earth passes over the cutting edge 10 it is held out of contact with the upper face of the shovel by the air in the grooves 12, and as a result the shovel blade is freed from earth which it lifts and prevents it from adhering to its inner surface by suction. The air in the grooves 12 provides a thin layer of air over substantially the entire surface of the shovel, the area of the cutting edge being practically the only friction producing portion. The inclined position of the walls of the grooves with relation to the longitudinal axis of the shovel is also of value in that it tends to spread the earth as it passes from the cutting edge to the rear of the shovel, and so aids in eliminating suction and sticking. The gradual widening of the grooves 12 is also of value in accomplishing this same result, and also insures a constant supply of air in the grooves 12. When working in water, as when dredging with a steam shovel or the like, it will be understood that the fluid medium which is maintained as a thin layer between the earth and the face of the shovel will be water. In Fig. 4 I have illustrated the application of my invention to a power shovel such as may be used in dredging or excavating. The two shells 13 are pivoted centrally, as at 14, in the usual manner and have their cutting edges 15 beveled, substantially as shown, with the upper portion of the bevel in substantial alignment with the upper portion 16 of the grooves 17, the lower portions of which are depressed throughout substantially the entire surface of the shells. In operation, when the cutting edges 15 engage the earth, such earth is forced inwardly over the cutting edge and thereafter rides upon a thin layer of air maintained in the grooves 17. When the shovel is opened to release the earth, it will fall freely from the face of the shovel and will not stick to its surface.

In Fig. 5 I have illustrated the application of my invention to a plow having a share 18 mounted in the usual manner upon the beam 19. The cutting edges 20 and 21 extending from the point 22 are beveled and reduced to as small an area as is consistent with strength, and the surface of the plow is formed with a series of grooves 23 with their major portions sunk below the plane of the upper faces of the cutting edges, so that after the earth is broken by the point 22 and cutting edges 20 and 21, it will be easily moved over the surface of the plow with a minimum of friction because of the layer of air maintained in the grooves 23.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claim.

Having described my invention, I claim:—

A shovel having a blade integrally formed with a cutting edge and a series of grooves below the plane of the cutting edge arranged to maintain a layer of fluid between the face of the shovel and the material being handled, said grooves having their forward extremities closely adjacent the cutting edge and the upper extremities of their walls substantially in the plane of the cutting edge.

In witness whereof I hereunto set my hand.

JOSEPH L. DEMARS.